(12) United States Patent
Schulz

(10) Patent No.: US 11,381,189 B2
(45) Date of Patent: Jul. 5, 2022

(54) METHODS AND SYSTEMS FOR IMPROVING CURRENT CAPABILITY FOR ELECTRIC MOTORS

(71) Applicant: Rivian IP Holdings, LLC, Plymouth, MI (US)

(72) Inventor: Steven E. Schulz, Torrance, CA (US)

(73) Assignee: Rivian IP Holdings, LLC, Irvine, CA (US)

(*) Notice: Subject to any disclaimer, the term of this patent is extended or adjusted under 35 U.S.C. 154(b) by 0 days.

(21) Appl. No.: 16/837,427

(22) Filed: Apr. 1, 2020

(65) Prior Publication Data

US 2020/0313593 A1    Oct. 1, 2020

Related U.S. Application Data

(60) Provisional application No. 62/827,807, filed on Apr. 1, 2019.

(51) Int. Cl.
| | |
|---|---|
| *H04L 47/24* | (2022.01) |
| *H02P 23/03* | (2006.01) |
| *H02P 29/68* | (2016.01) |
| *H02P 23/14* | (2006.01) |
| *H02P 27/08* | (2006.01) |

(52) U.S. Cl.
CPC .............. *H02P 23/03* (2013.01); *H02P 23/14* (2013.01); *H02P 27/085* (2013.01); *H02P 29/68* (2016.02)

(58) Field of Classification Search
CPC .......... H02P 23/03; H02P 29/68; H02P 23/14; H02P 27/085; H02P 27/08
See application file for complete search history.

(56) References Cited

U.S. PATENT DOCUMENTS

| | | | |
|---|---|---|---|
| 2002/0044472 | A1 | 4/2002 | Arnet et al. |
| 2004/0004852 | A1* | 1/2004 | Hsu ................... H02M 7/53875 363/132 |
| 2010/0171456 | A1* | 7/2010 | Chakrabarti ...... H02M 7/53875 318/461 |
| 2011/0187301 | A1* | 8/2011 | Stancu .................... B60L 50/15 318/400.3 |

(Continued)

OTHER PUBLICATIONS

International Search and Written Opinion from PCT/US2020/026226 dated Jun. 24, 2020.

*Primary Examiner* — Muhammad S Islam

(74) *Attorney, Agent, or Firm* — Haley Guiliano LLP

(57) ABSTRACT

The system determines that a multiphase electric motor is in a low-speed operating range, near stall. The system determines a duty cycle for each phase of the multiphase electric motor. The duty cycle includes a nominal component and a zero-sequence component configured to balance temperature rises of power electronics devices of the motor drive. Power electronics devices can include diodes, IGBTs, or other switches or devices. The system causes each duty cycle to be applied to a corresponding switch of the corresponding phase of the multiphase electric motor to cause current flow in the corresponding phase. The system may determine duty cycles corresponding to a thermal balance between a switch and a diode of a phase and a thermal balance between a pair of like devices of different phases, and then determine which duty cycle is closer to a predetermined value.

20 Claims, 8 Drawing Sheets

(56) References Cited

U.S. PATENT DOCUMENTS

| | | | | |
|---|---|---|---|---|
| 2013/0329471 A1* | 12/2013 | Escobar | .............. | H02M 7/4833 |
| | | | | 363/40 |
| 2015/0155795 A1* | 6/2015 | Hirsch | .................... | H02M 7/48 |
| | | | | 318/400.26 |
| 2015/0236628 A1* | 8/2015 | Wang | ...................... | H02P 27/08 |
| | | | | 318/139 |
| 2015/0303826 A1* | 10/2015 | Arnedo | ................. | H02M 7/537 |
| | | | | 363/97 |
| 2016/0094177 A1* | 3/2016 | Shimomugi | .......... | H02P 27/085 |
| | | | | 318/400.2 |
| 2016/0315558 A1* | 10/2016 | Lee | ....................... | H02M 7/537 |
| 2016/0329832 A1* | 11/2016 | Aeloiza | .................. | H02M 1/12 |
| 2017/0302199 A1* | 10/2017 | Boulharts | ................. | H02P 5/74 |

* cited by examiner

METHODS AND SYSTEMS FOR IMPROVING CURRENT CAPABILITY FOR ELECTRIC MOTORS

CROSS-REFERENCE TO RELATED APPLICATION

This application claims the benefit of U.S. Provisional Patent Application No. 62/827,807 filed Apr. 1, 2019, the disclosure of which is hereby incorporated by reference herein in its entirety.

The present disclosure is directed towards improving current capability of electric motors, and more particularly towards improving current capability near a stall condition.

SUMMARY

Electric vehicles include electric powertrains, generally including one or more electric motors. At relatively lower rates of rotation, temperature rise across power electronics components may reach undesirable levels or otherwise may impact operation. It would be advantageous to provide electric motor control at low speeds in such a way to avoid undesirable temperature increases.

In some embodiments, the present disclosure is directed to systems and methods for controlling a multiphase electric motor at low speed. The system determines that the multiphase electric motor is in a low-speed operating range. The system determines a duty cycle for each phase of the multiphase electric motor. The duty cycle includes a nominal component and a zero-sequence component configured to balance temperature rises of power electronics devices. The power electronics devices may include IGBTs, any other suitable switching devices, diodes, any other suitable components, or any combination thereof. The system causes each duty cycle to be applied to a corresponding switch of the corresponding phase of the multiphase electric motor to cause current flow in the corresponding phase. For example, the zero-sequence component may be, but need not be, the same for each phase of the multiphase electric motor.

In some embodiments, the system determines the duty cycle for each phase of the multiphase electric motor by determining a first duty cycle corresponding to a thermal balance between a switch and a diode of a phase, determining a second duty cycle corresponding to a thermal balance between a pair of like devices of different phases, and determining which duty cycle of the first duty cycle and the second duty cycle is closer to a predetermined value.

In some embodiments, the system determines the duty cycle for each phase of the multiphase electric motor by retrieving the duty cycle from a database based on searching the database based on one or more operating parameters.

In some embodiments, the system determines the duty cycle for each phase of the multiphase electric motor by applying a piecewise function based on one or more operating parameters.

In some embodiments, the system determines that the motor is in the low-speed operating range based on at least one sensor signal received by the control circuitry.

In some embodiments, the system determines the duty cycle for each phase of the multiphase electric motor by determining thermal information for the power electronics devices.

In some embodiments, the system determines which of the power electronics devices are thermally-limiting.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

Figure 1:
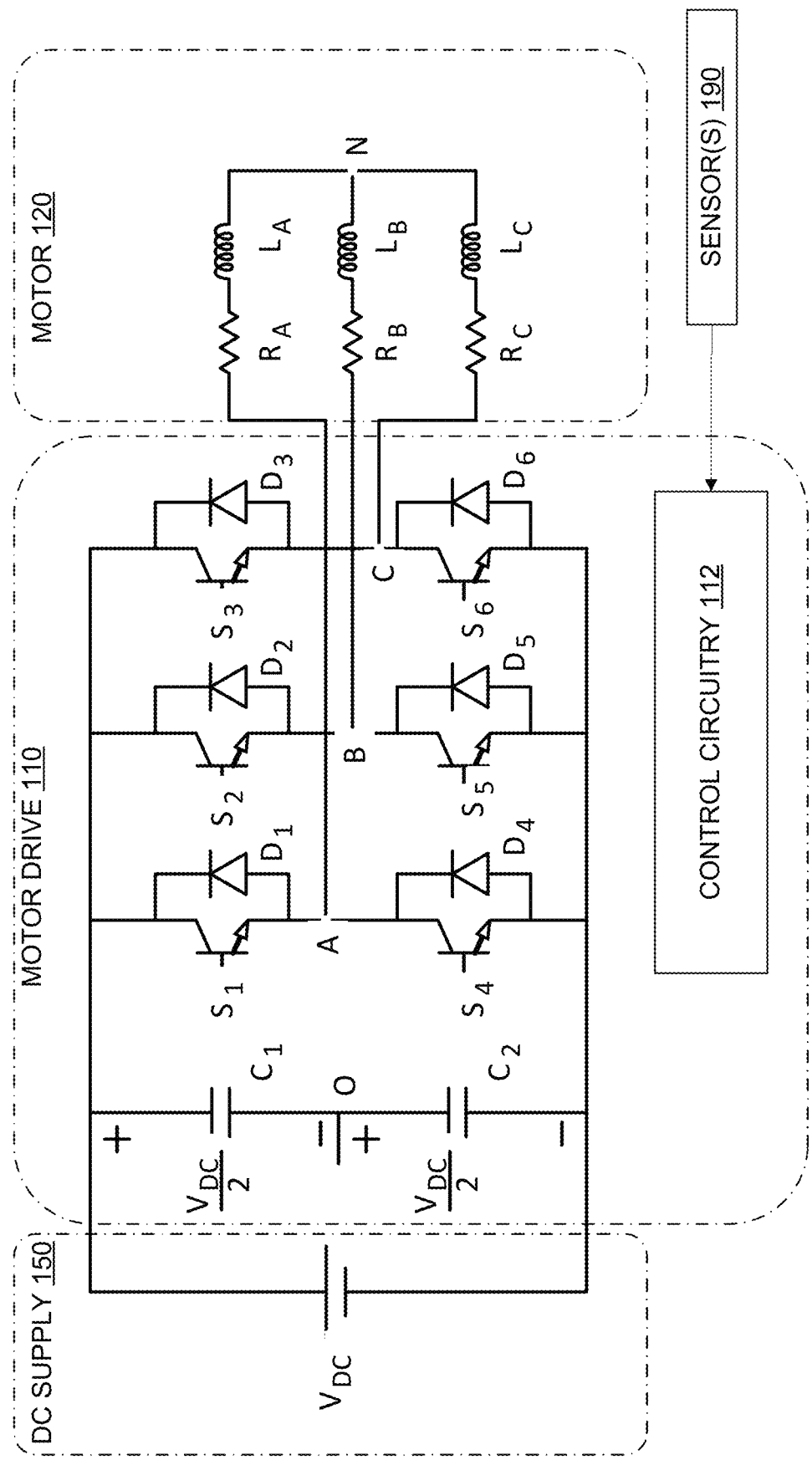
FIG. 1 shows a system diagram of an illustrative motor drive and motor, in accordance with some embodiments of the present disclosure.

In some embodiments, variable speed motor drives are used in electric and hybrid vehicles to control an AC electric machine (e.g., a three-phase electric motor). FIG. 1 shows illustrative motor drive 110 and motor 120, in accordance with some embodiments of the present disclosure. As illustrated in FIG. 1, DC supply 150 provides a DC bus for motor drive 110 to drive phases of motor 120 (e.g., three-phase as illustrated). Motor drive 110 includes control circuitry 112, which is configured to, for example, provide control signals to $S_1$-$S_6$. For example, motor drive 110 may include an inverter configured to use pulse width modulation (PWM) techniques to convert a DC input voltage (e.g., provided by DC supply 150) to an AC output voltage and current in order to drive motor 120. As used herein, duty cycle "d" is in reference to the upper switch's duty cycle for a phase, and accordingly, a lower switch would be driven by the complimentary duty cycle "1−d". In a further example, the fundamental frequency of the AC output of motor drive 110 is proportional to the mechanical speed (e.g., angular speed) of motor 120. As the motor's mechanical speed approaches zero (e.g., stopped), the AC output waveform frequency tends toward zero as well. For example, at a stall condition for which the angular speed is zero, the motor current becomes DC. At the stall condition, power semiconductor devices (e.g., any of transistors $S_1$-$S_6$, or diodes $D_1$-$D_6$) may become stressed, or overstressed, as they may be forced to carry a peak phase current continuously as opposed to a time varying sine-wave waveform with corresponding lower average and rms phase current values. This may result in excessive heating of the devices (e.g., transistors, diodes, or both). While the previous description is in the context of synchronous motors, the present disclosure may be applied to asynchronous motors as well (e.g., an induction machine), for example, by taking into account slip in the fundamental frequency of the output waveforms.

In some embodiments, a switching frequency may be reduced to mitigate the power dissipation. However, below a certain frequency (e.g., such as 2 kHz) switching losses in the diode are already negligible and further reduction in switching frequency will have little impact on overall diode dissipation. The inverter is forced to reduce (or de-rate) the motor current significantly at stall, resulting in lower motor torque and compromised vehicle performance. Further, the temperature rise on the power semiconductor devices at stall is not necessarily balanced. One device may be significantly hotter than the others, and thus becomes the limiting factor dictating the amount of de-rating required. In some circumstances, for example, the diode is the limiting device, due to higher thermal impedance and conduction losses compared to the switch (e.g., an IGBT or any other suitable switch). While the IGBT is used herein as an illustrative switch device, a switch is not limited to an IGBT and may include, for example, a bipolar junction transistor (BJT), any other suitable switch, or any combination thereof. In some circumstances, for example, the switch is the limiting device as compared to the diode. In some embodiments, the present disclosure is directed to systems and methods to lessen de-rating required at stall by balancing the temperature rise on the hottest devices within the inverter.

In some embodiments, the present disclosure provides a method to reduce a temperature rise on a semiconductor device within the motor drive during very low speed (e.g., near stall) and stall operation, thus allowing higher output current to the motor. In some embodiments, the method includes using a continuous PWM (or CPWM) type modulation technique. For example, the controller takes into account imbalances in the temperature rise between IGBTs and diodes at or near stall. A zero-sequence duty cycle (e.g., a duty cycle that is added equally to all three phases but does not result in any change in current flow to phases of the motor) is determined to minimize a maximum junction temperature at these very low speeds.

Referencing FIG. 1, for example, the controller may determine a duty cycle $d_A$ for switch $S_1$ (e.g., an IGBT) to provide current to phase A (assuming phase current flowing out of the inverter). During the $1-d_A$ period (e.g., when $S_1$ is switched off), current flows through $D_4$ to phase A. Accordingly, the duty cycle for a phase impacts the current flow, and thus the thermal behavior, of switches and diodes. In a further example, referencing FIG. 1, the controller may determine to provide the two largest currents to phases A and B. The phase currents in phases A and B will have different sign (e.g., one will be positive, and the other will be negative). The current flow, and temperature rise, in each diode and switch (e.g., IGBT or any other suitable switch) will be dependent upon the duty cycle.

In some embodiments, motor drive 110 may be an integrated unit, having an electrical interface to DC supply 150 and motor 120, a communications interface to an external controller, and coolant ports configured to provide an inlet and outlet of coolant for cooling switches and diodes and other current carrying components.

In an illustrative example, control circuitry 112 may include a processor, one or more relays, input/output (e.g., pins, terminals, or connectors), communication hardware, and memory. Control circuitry 112 may include hardware, software, or both, implemented on one or more modules configured to provide control of a motor (e.g., by controlling currents in the motor). In some embodiments, control circuitry 112 includes a processor that includes one or more microprocessors, microcontrollers, digital signal processors, programmable logic devices, field-programmable gate arrays (FPGAs), application-specific integrated circuits (ASICs), or any suitable combination thereof. In some embodiments, the processor is distributed across more than one processor or processing units. In some embodiments, control circuitry 112 executes instructions stored in memory for managing a motor. In some embodiments, the memory includes an electronic storage device that is part of control circuitry 112. For example, memory may be configured to store electronic data, computer instructions, applications, firmware, or any other suitable information. In some embodiments, the memory includes random-access memory, read-only memory, hard drives, optical drives, solid state devices, or any other suitable memory storage devices, or any combination thereof. For example, memory may be used to launch a start-up routine, a near-stall routine, or other collection of instructions.

In some embodiments, control circuitry 112 is powered by a power supply (e.g., DC supply 150, or portion thereof, any other suitable power supply). In some embodiments, power supply 150 includes one or more batteries (e.g., of any suitable voltage and interconnection), a DC-DC converter, any other power supply, any corresponding components (e.g., terminals, switches, fuses, and cables), or any combination thereof.

In some embodiments, a user interface (not illustrated) that includes a push button, a toggle switch, a display screen (e.g., a touch screen), a key fob, a key-lock combination, any other suitable system or component for receiving input from a user or providing output to a user, or any combination thereof may be coupled to control circuitry 112. In some embodiments, the user interface includes a touchscreen on the dash of a vehicle, configured to receive input from the user, and provide a display to the user. In some embodiments, the user interface includes one or more buttons that are selectable by a user. For example, the one or more buttons may include a button coupled to a switch, a button on a touchpad, any other suitable button that may be used by a user to make a selection, or any combination thereof. In some embodiments, a key fob includes one or more buttons, which, when pressed by a user, may provide an indication to a communications interface of control circuitry 112. In some embodiments, the user interface is implemented on a smartphone, tablet, or other portable device, which may communicate with control circuitry 112 via a communications interface.

In some embodiments, sensor(s) 190 include one or more current sensors, voltage sensors, torque sensors, temperature sensors, sensors configured to sense any other suitable property or change thereof, any other suitable sensors, or any combination thereof. For example, sensor(s) 190 may include an optical encoder, a magnetic encoder, a potentiometer, or other suitable device for determining a rotary position or speed. In a further example, sensor(s) 190 may include a current sensor configured to measure current provided to motor 120. In a further example, sensor(s) 190 may include a temperature sensor (e.g., a thermocouple, a resistance temperature detector, a thermistor, an optical thermal measurement sensor) for measuring a temperature of one or more components.

Figure 2:
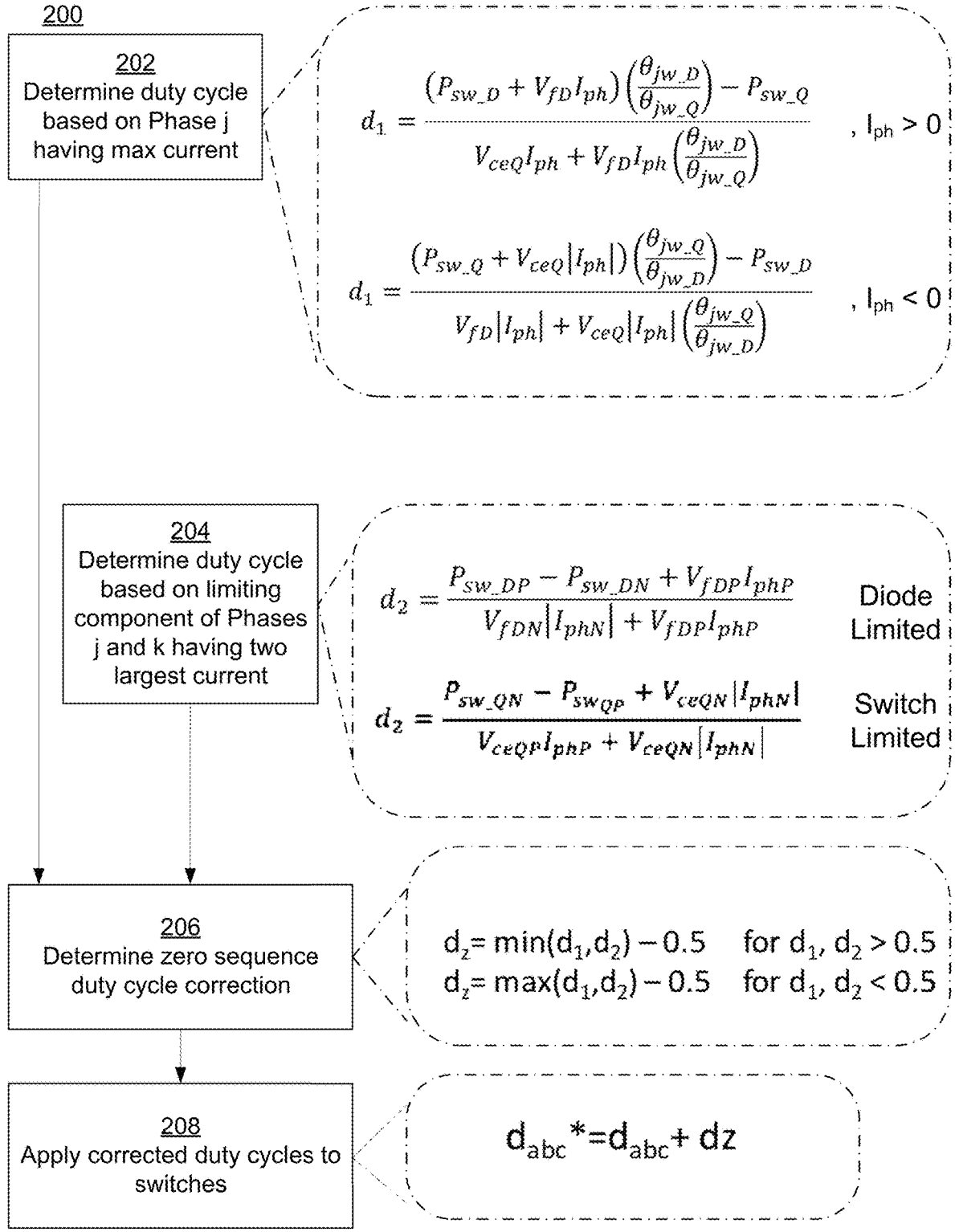
FIG. 2 shows a flowchart of an illustrative process for modifying a duty cycle based on estimated device temperature, in accordance with some embodiments of the present disclosure.

FIG. 2 shows a flowchart of illustrative process 200 modifying a duty cycle based on estimated device temperature, in accordance with some embodiments of the present disclosure. Eqs. 1-10 described in the context of FIG. 2 are merely illustrative, and any suitable formulation may be used in accordance with the present disclosure. For example, additional terms or alternative functional forms of terms may be used to determine a duty cycle, zero sequence duty cycle, or both.

Step 202 includes the control circuitry determining a duty cycle based on a phase having the maximum current flow (e.g., positive or negative). For the phase carrying the largest amplitude current, a duty cycle d1 is computed to balance the temperature rise on that phase's conducting diode and switched IGBT. The control circuitry determines duty cycle d1 effectively shifts the conduction loss between that phase's diode and IGBT as necessary to result in the lowest junction temperatures.

In an illustrative example, in the context of step 202, the control circuitry may seek to balance the temperature rise in an IGBT and Diode of a phase accordingly to Eq. 1 (below). For example, referencing FIG. 1, the IGBT and Diode may include $S_1$ and $D_4$, $S_2$ and $D_5$, $S_3$ and $D_6$, $S_4$ and $D_1$, $S_5$ and $D_2$, or $S_6$ and $D_3$. Eq. 2 shows Eq. 1 recast in terms of power dissipation and thermal resistance. While Eq. 2, as shown here, includes only the self-heating effect of each device, in some embodiments, Eq. 2 includes cross-coupling thermal impedance terms from one device to the other. The resultant equations 2 thru 5 would be slightly different, but would still provide a similar result, as the cross-coupling thermal impedances are much higher than the self-impedance of each device. Eq. 3 shows Eq. 2 recast in terms of switching power, duty cycle, voltage, thermal resistance and phase current, when the phase current is positive (e.g., upper switches in FIG. 1 controlled). Eq. 4 shows duty cycle d1 solved for from Eq. 3. Eq. 5 shows duty cycle d1 solved for similarly to Eq. 4, but with phase current negative (e.g., lower switches in FIG. 1 controlled). To illustrate, Eq. 5 is achieved by changing in Eq. 3 the "$d_1$" to "$(1-d_1)$," and the "$(1-d_1)$" to "$d_1$", and then solving for $d_1$.

$$\Delta T_{jw\_Q} = \Delta T_{jw\_D} \qquad \text{Eq. 1}$$

$$P_Q * \theta_{jw\_Q} = P_D * \theta_{jw\_D} \qquad \text{Eq. 2}$$

$$(P_{sw\_Q} + d_1 V_{ceQ} I_{ph}) * \theta_{jw\_Q} = [P_{sw\_D} + (1 - d_1) V_{fD} I_{ph}] * \theta_{jw\_D} \qquad \text{Eq. 3}$$

$$d_1 = \frac{(P_{sw\_D} + V_{fD} I_{ph})\left(\frac{\theta_{jw\_D}}{\theta_{jw\_Q}}\right) - P_{sw\_Q}}{V_{ceQ} I_{ph} + V_{fD} I_{ph}\left(\frac{\theta_{jw\_D}}{\theta_{jw\_Q}}\right)} \qquad \text{Eq. 4}$$

$$d_1 = \frac{(P_{sw\_D} + V_{fD} I_{ph})\left(\frac{\theta_{jw\_D}}{\theta_{jw\_Q}}\right) - P_{sw\_Q}}{V_{ceQ} I_{ph} + V_{fD} I_{ph}\left(\frac{\theta_{jw\_D}}{\theta_{jw\_Q}}\right)} \qquad \text{Eq. 5}$$

where,

| | |
|---|---|
| $\Delta T_{jw\_Q}$ | Temperature difference between IGBT and coolant |
| $\Delta T_{jw\_D}$ | Temperature difference between Diode and coolant |
| $P_Q$ | Power dissipated in IGBT (e.g., Watts) |
| $\theta_{jw\_Q}$ | Thermal resistance of IGBT |
| $P_D$ | Power dissipated in Diode (e.g., Watts) |
| $\theta_{jw\_D}$ | Thermal resistance of DIODE |
| $P_{sw\_Q}$ | Switching power dissipation in IGBT |
| $d_1$ | Determined duty cycle |
| $V_{ceQ}$ | On-state collector-emitter Voltage across IGBT |
| $I_{ph}$ | Phase current in phase corresponding to Q and D |
| $P_{sw\_D}$ | Switching power dissipation in Diode |
| $V_{fD}$ | Forward Voltage across Diode |

For some phase current angles, the duty cycle $d_1$ as determined at step 202 may result in another phase having a higher junction temperature even though it has equal or lower phase current amplitude. Therefore, a second duty cycle $d_2$ is computed, at step 204, to balance the maximum junction temperature rise in the phases carrying the two largest amplitude currents. For the two phases carrying the largest amplitude currents, duty cycle $d_2$ is computed to balance the temperature rise of the diodes or IGBTs of those two phases. The control circuitry determines $d_2$ based on the two phases' diodes if they are thermally limiting, or the phases' IGBTs if they are thermally limiting.

In an illustrative example, in the context of step 204, the control circuitry may seek to balance the temperature rise in like-devices of two phases according to Eq. 6 (below), wherein in one phase the current will be positive (+) and in the other phase the current will be negative (−). For example, referencing FIG. 1, the like devices may include D4 and D2, or D3 and D5, among other combinations for a diode-limited system, and may include S1 and S5, or S2 and S4, among other combinations for an IGBT-limited system. Eq. 7 shows Eq. 1 recast in terms of power dissipation (e.g., assuming thermal resistances are equal), for the diode-limited case. Eq. 8 shows Eq. 7 recast in terms of switching power, duty cycle, voltage, and phase currents. Eq. 9 shows duty cycle $d_2$ solved for from Eq. 8. Eq. 10 shows duty cycle $d_2$ solved for similarly to Eq. 9, but for an IGT-limited system. To illustrate, Eq. 10 may be arrived at by formulating an expression similar to Eq. 8, but for IGBTS rather than diodes, and solving for $d_2$.

Step 206 includes the control circuitry determining a zero-sequence duty cycle correction. In some embodiments, the control circuitry may determine which duty cycle $d_1$ or $d_2$ is closest to 0.5 (e.g., the approximate nominal duty cycle at or near the stall condition for continuous PWM techniques), and determine the zero-sequence duty cycle $d_z$ based on that duty cycle.

$$\Delta T_{jw\_DP} = \Delta T_{jw\_DN} \qquad \text{Eq. 6}$$

$$P_{DP} = P_{DN} \qquad \text{Eq. 7}$$

$$P_{sw\_DP} + (1 - d_2)V_{fDP} I_{phP} = P_{sw\_DN} + d_2 V_{fDN} |I_{phN}| \qquad \text{Eq. 8}$$

$$d_2 = \frac{P_{sw\_DP} + P_{sw\_DN} + V_{fDP} I_{phP}}{V_{fDN} |I_{phN}| + V_{fDP} I_{phP}} \qquad \text{Eq. 9}$$

$$d_2 = \frac{P_{sw\_QN} + P_{sw_{QP}} + V_{ceQN} |I_{phN}|}{V_{ceQP} I_{phP} + V_{ceQN} |I_{phN}|} \qquad \text{Eq. 10}$$

where,

| | |
|---|---|
| $\Delta T_{jw\_DP}$ | Temperature difference between +Diode and coolant |
| $\Delta T_{jw\_DN}$ | Temperature difference between −Diode and coolant |
| $P_{DP}$ | Power dissipated in +Diode |
| $P_{DN}$ | Power dissipated in −Diode |
| $P_{sw\_DP}$ | Switching power dissipation in +Diode |
| $d_2$ | Determined duty cycle |
| $V_{fDP}$ | Forward Voltage across +Diode |
| $I_{phP}$ | Phase current in phase corresponding to +Diode |
| $P_{sw\_DN}$ | Switching power dissipation in −Diode |
| $V_{fDN}$ | Forward Voltage across −Diode |
| $I_{phN}$ | Phase current in phase corresponding to −Diode |
| $P_{sw\_QN}$ | Switching power dissipation in −IGBT |
| $P_{swQP}$ | Switching power dissipation in +IGBT |
| $V_{ceQN}$ | Collector-emitter Voltage across −IGBT |
| $I_{phN}$ | Phase current in phase corresponding to −IGBT |
| $V_{ceQP}$ | Collector-emitter Voltage across +IGBT |
| $I_{phP}$ | Phase current in phase corresponding to +IGBT |

Step 208 includes the control circuitry applying the correction of step 206 to the duty cycle for each phase. For example, zero-sequence duty cycle $d_z$ (e.g., which may be a positive or negative correction) is added to each phase duty cycle (e.g., $d_A$, $d_B$, and $d_C$), and then sent to the final duty commands to the power switches. This results in the lowest peak temperature for all three phases.

In some embodiments, the zero-sequence duty cycle correction is only applied at high current commands and low motor speeds. At low current commands, the junction temperatures are well below the maximum allowable value and no zero-sequence adjustment need be applied. As motor speed increases above some minimum threshold, the power devices no longer have to carry the peak motor current for extended periods of time. The semiconductor thermal time constant tends to filter out the pulsating power resulting in lower peak junction temperatures. Therefore, the zero-sequence duty cycle may be phased out as motor speed increases above some low threshold value. This also ensures the zero-sequence duty cycle correction will be disabled once the modulation index begins to increase, thus preventing the zero sequence from pushing the final duty cycles close to either the upper or lower duty cycle boundaries. For example, the techniques of the present disclosure may increase stall current capability by up to ~10% in some circumstances.

In some embodiments, the method includes determining a zero-sequence duty cycle intended to balance the maximum junction temperatures in the inverter. This method is especially effective when IGBT and diode are not perfectly matched. The method also takes into account current in multiple phases, which is important when the phase current vector is not perfectly aligned with any of the phase axes. The use of the zero-sequence duty cycle correction may also help to minimize the torque notch around zero speed. In some embodiments, the disclosed techniques apply to continuous PWM techniques, they may provide reduced acoustic noise and current ripple as compared to discontinuous PWM methods. In some embodiments the disclosed techniques may be applied to non-continuous PWM techniques FIGS. 3-4 are presented in the context of phase A having the largest current, and the current being positive, for purposes of illustration.

Figure 3:
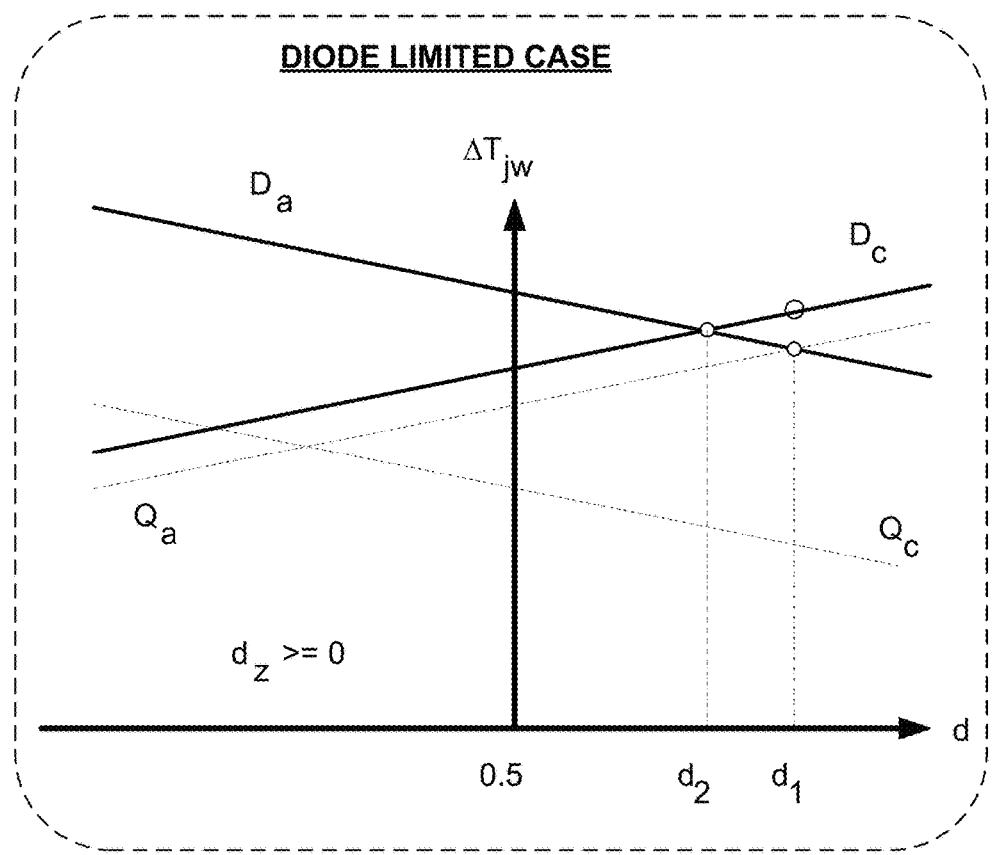
FIG. 3 shows an illustrative plot of diode and IGBT temperature rises relative to coolant temperature as a function of duty cycle d for a diode-limited system (e.g., where the temperature rise of the diodes limits current), in accordance with some embodiments of the present disclosure.

FIG. 3 shows an illustrative plot of diode and IGBT temperature rises relative to coolant temperature as a function of duty cycle d for a diode-limited system (e.g., where the temperature rise of the diodes limits current), in accordance with some embodiments of the present disclosure. To illustrate, power electronics devices such as IGBTs and Diodes may be liquid cooled, by a temperature-controlled liquid, and the difference in temperature between the component and the liquid provides an indication of heat dissipation in the device. For example, $D_A$ is the temperature of the phase A diode relative to coolant, $D_C$ is the temperature of the phase C diode relative to coolant, $Q_A$ is the temperature of the phase A IGBT relative to coolant, $Q_C$ is the temperature of the phase C IGBT relative to coolant. Shown illustratively are $d_1$ and $d_2$, as determined by process 200. In the illustrated example, the control circuitry selects $d_2$ instead of $d_1$ because it is numerically closer to 0.5 (e.g., step 206 of process 200). If the control circuitry were to choose $d_1$, then while $D_A$ and $Q_A$ are matched, $D_C$ may become too large (or limiting), illustrated by the open red circle in FIG. 3.

Figure 4:
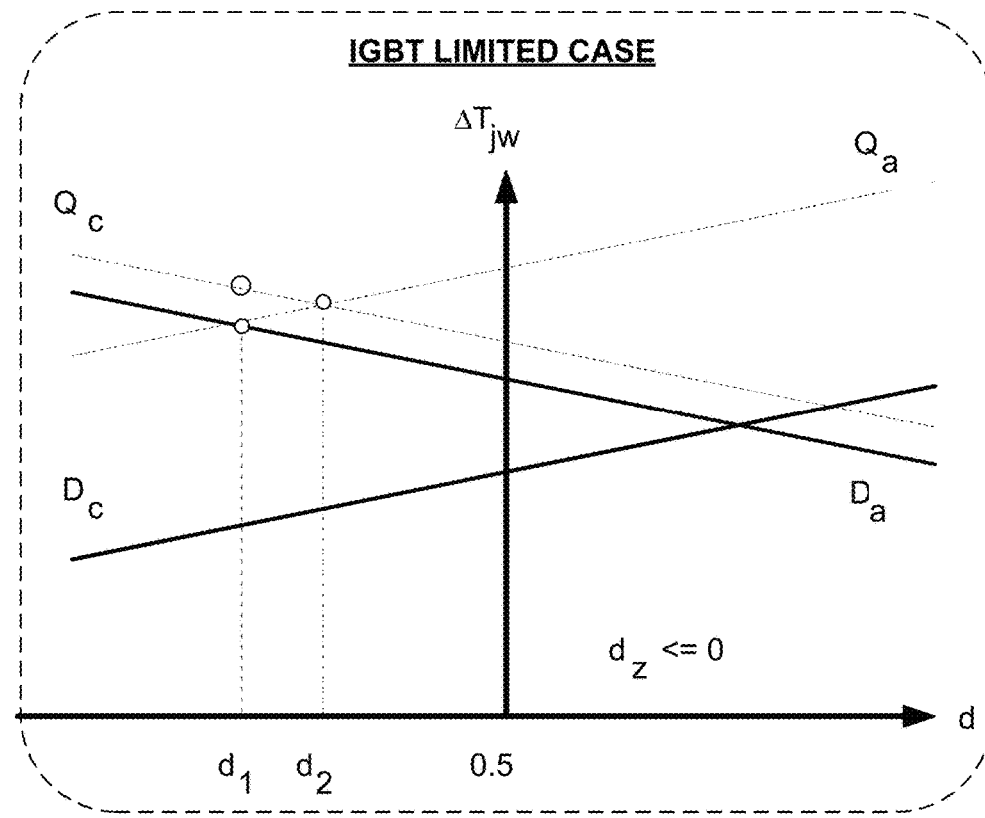
FIG. 4 shows an illustrative plot of diode and IGBT temperature rises relative to coolant as a function of duty cycle d for an IGBT-limited system (e.g., where the temperature rise of the IGBT limits current), in accordance with some embodiments of the present disclosure.

FIG. 4 shows an illustrative plot of diode and IGBT temperature rises relative to coolant as a function of duty cycle d for an IGBT-limited system (e.g., where the temperature rise of the IGBT limits current), in accordance with some embodiments of the present disclosure. Shown illustratively are $d_1$ and $d_2$, as determined by process 200. In the illustrated example, the control circuitry chooses $d_2$ because it is closer to 0.5. If the control circuitry were to choose $d_1$, then while $D_A$ and $Q_A$ are matched, Qc may become too large (or limiting).

Figure 5:
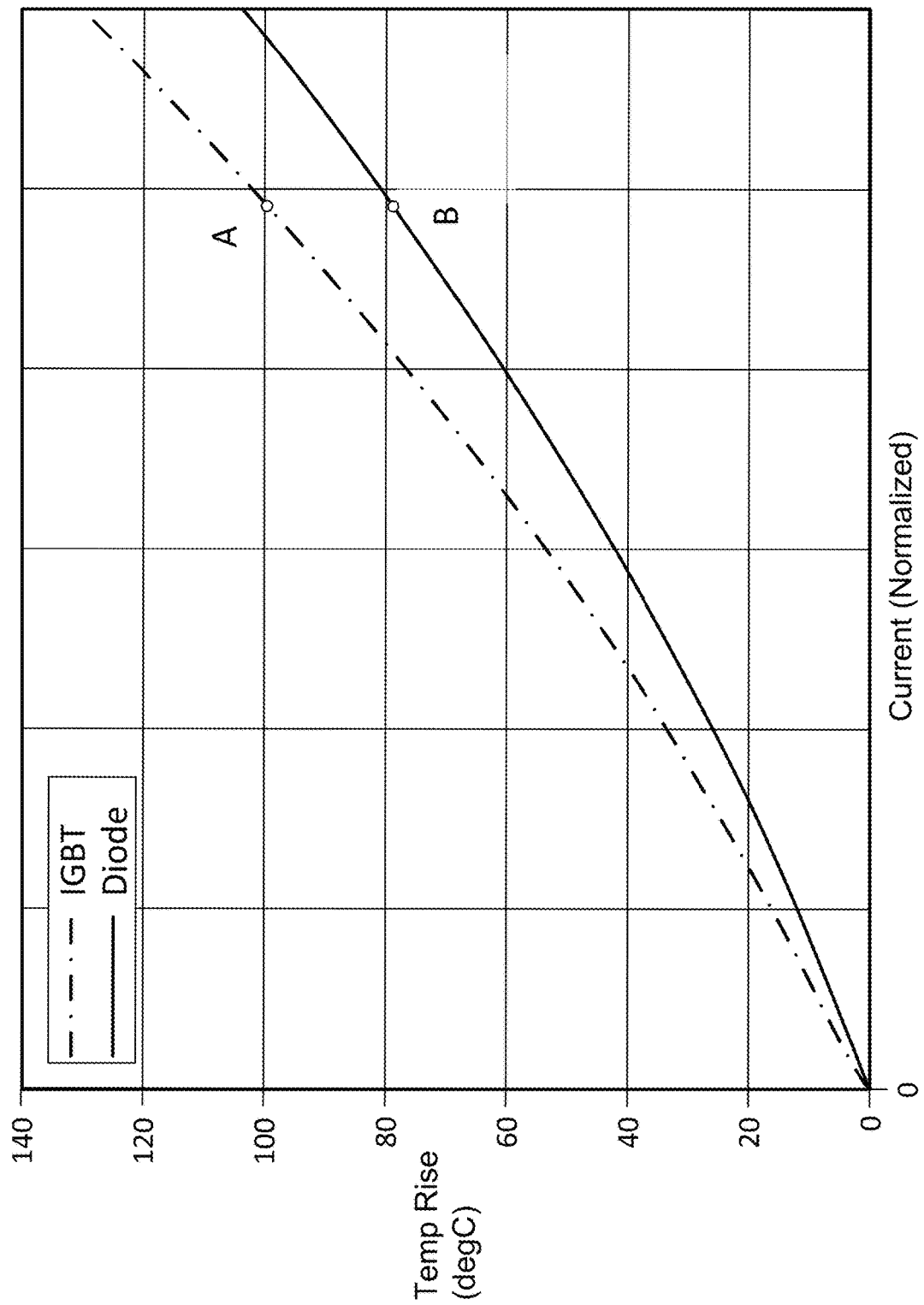
FIG. 5 shows an illustrative plot of diode and IGBT temperature rises relative to coolant as a function of rms phase current (normalized), in accordance with some embodiments of the present disclosure.

FIG. 5 shows an illustrative plot of diode and IGBT temperature rises relative to coolant as a function of rms phase current (normalized), in accordance with some embodiments of the present disclosure. The plot corresponds to a stall condition, continuous PWM, a nominal duty cycle of 0.5, constant coolant flow, and a constant switching frequency. Note that the coolant flow is provided to passages of cooling jackets of motor drive 110, which are configured to cool devices. As illustrated, the system is diode-limited because the diode reaches the temperature threshold at a lower current than the IGBT. The temperature rise threshold may be, but need not be, the same for a diode and an IGBT. For example, if the temperature rise threshold is 100° C., then the diode limits the maximum phase rms current as shown by point A, while the IGBT exhibits a rise of only 79° C. (e.g., it is under-utilized) as shown by point B. Introduction of a zero-sequence duty cycle correction may help to increase this max current by balancing the current in the phase between the IGBT and the diode.

Figure 6:
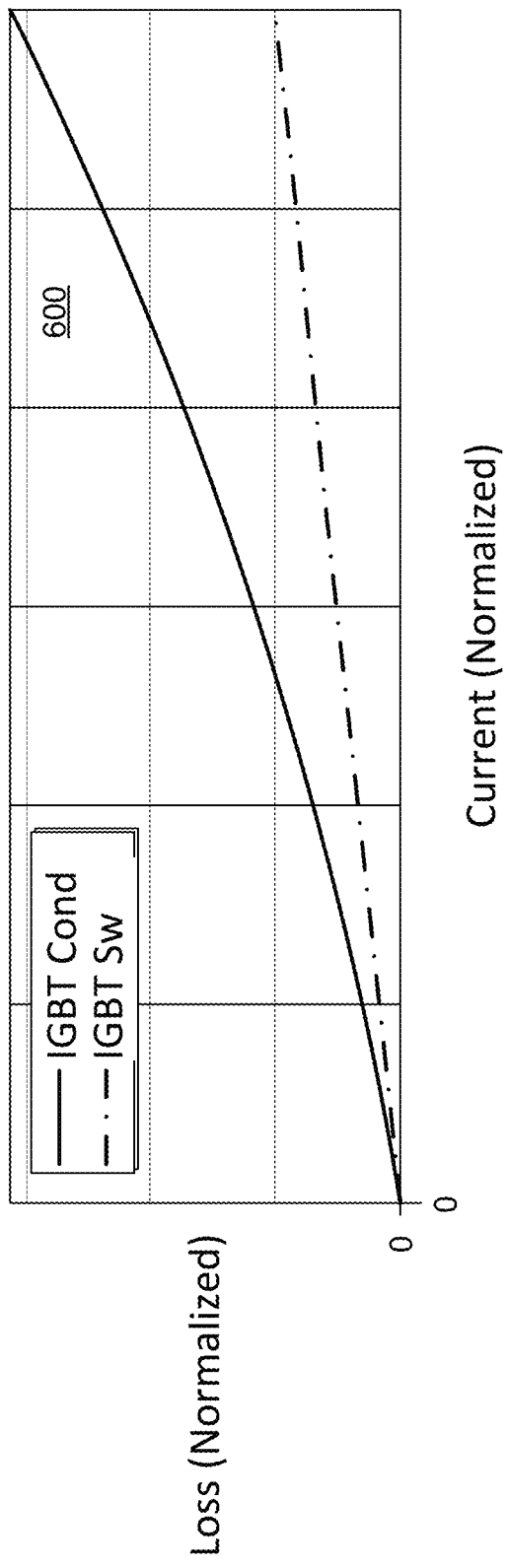
FIG. 6 shows two illustrative plots of diode and IGBT conduction and switching losses with phase current, corresponding to the data of FIG. 5, in accordance with some embodiments of the present disclosure.
Figure 6:
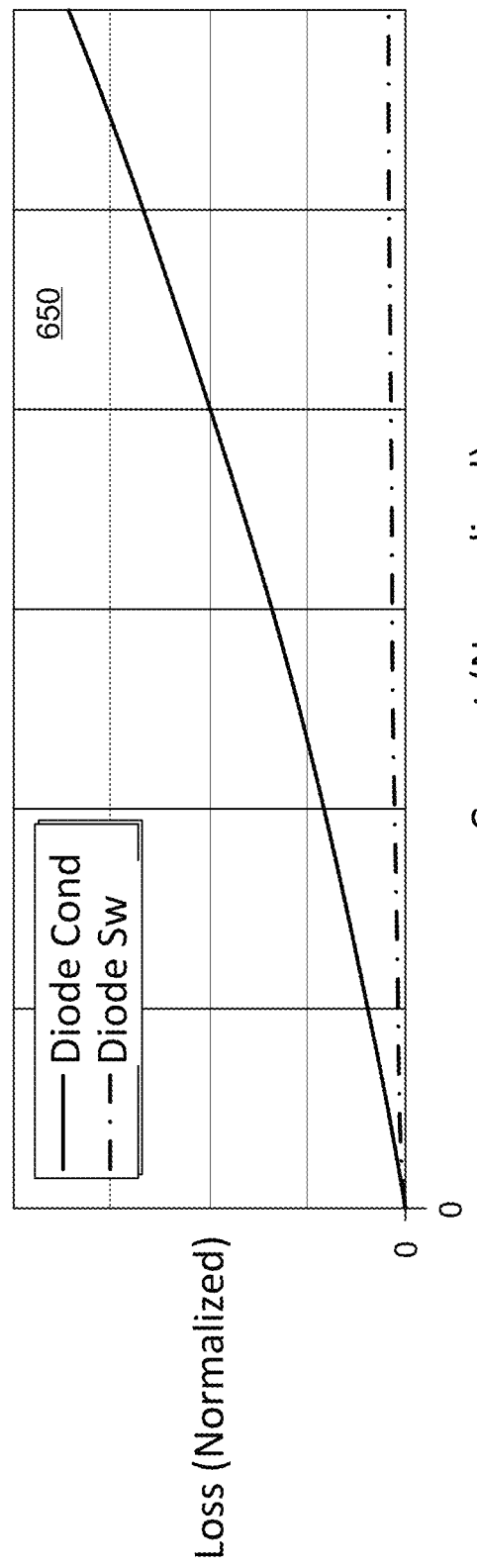

FIG. 6 shows two illustrative plots of diode and IGBT conduction (Cond) and switching (Sw) losses with phase current, corresponding to the data of FIG. 5, in accordance with some embodiments of the present disclosure. Plots 600 and 650 correspond to a stall condition, continuous PWM, duty cycle of 0.5, a constant coolant flow, and a constant switching frequency. As illustrated in plot 650, reducing the switching frequency further will not reduce losses much in the diode as the switching loss is near zero. The horizontal and vertical divisions (e.g., the grid) of plots 600 and 650 are the same for comparison. For example, each grid rectangle in plots 600 and 650 has the same dimensions in normalized current and normalized loss.

Figure 7:
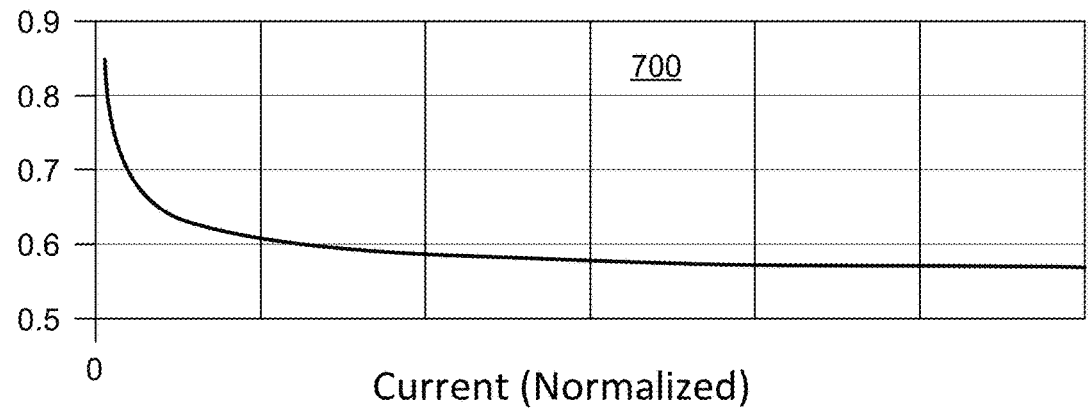
FIG. 7 shows three illustrative plots of modified duty cycle, unmodified temperature rise, and modified temperature rise, in accordance with some embodiments of the present disclosure.
Figure 7:
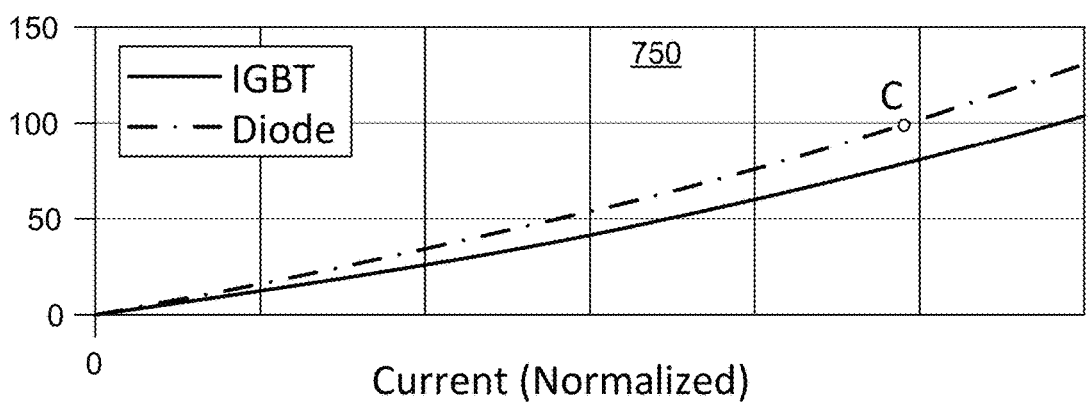
Figure 7:
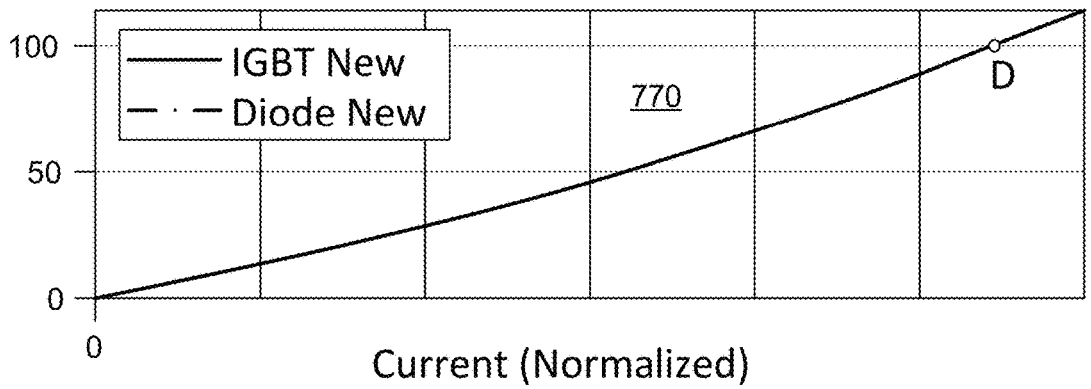

FIG. 7 shows three illustrative plots of modified duty cycle (plot 700), unmodified temperature rise (plot 750), and modified temperature rise (plot 770), in accordance with some embodiments of the present disclosure. Plots 700, 750 and 770 correspond to a stall condition, continuous PWM, duty cycle of 0.5, a constant coolant flow, and a constant switching frequency. Plot 750 is the same as that shown in FIG. 5, for a nonmodified duty cycle. Plot 700 shows an illustrative plot of modified duty cycle (e.g., from step 208 of process 200) as a function of phase current. Plot 770 shows diode and IGBT temperature rises relative to coolant when the modified duty cycles of plot 700 are implemented (e.g., using process 200). As illustrated, the diode and IGBT temperatures are substantially coincident (e.g., the difference is not discernible to the resolution of plot 770). As shown, by use of the zero-sequence duty-cycle correction, the maximum phase current is increased by balancing the temperature rise in the diode and IGBT (e.g., as shown by comparing points C and D). Accordingly, the use of a zero-sequence duty cycle correction improves the current capacity at or near stall, without de-rating torque or further adjusting switching frequency. The horizontal divisions (e.g., the grid) of plots 700, 750, and 770 are the same for comparison.

Figure 8:
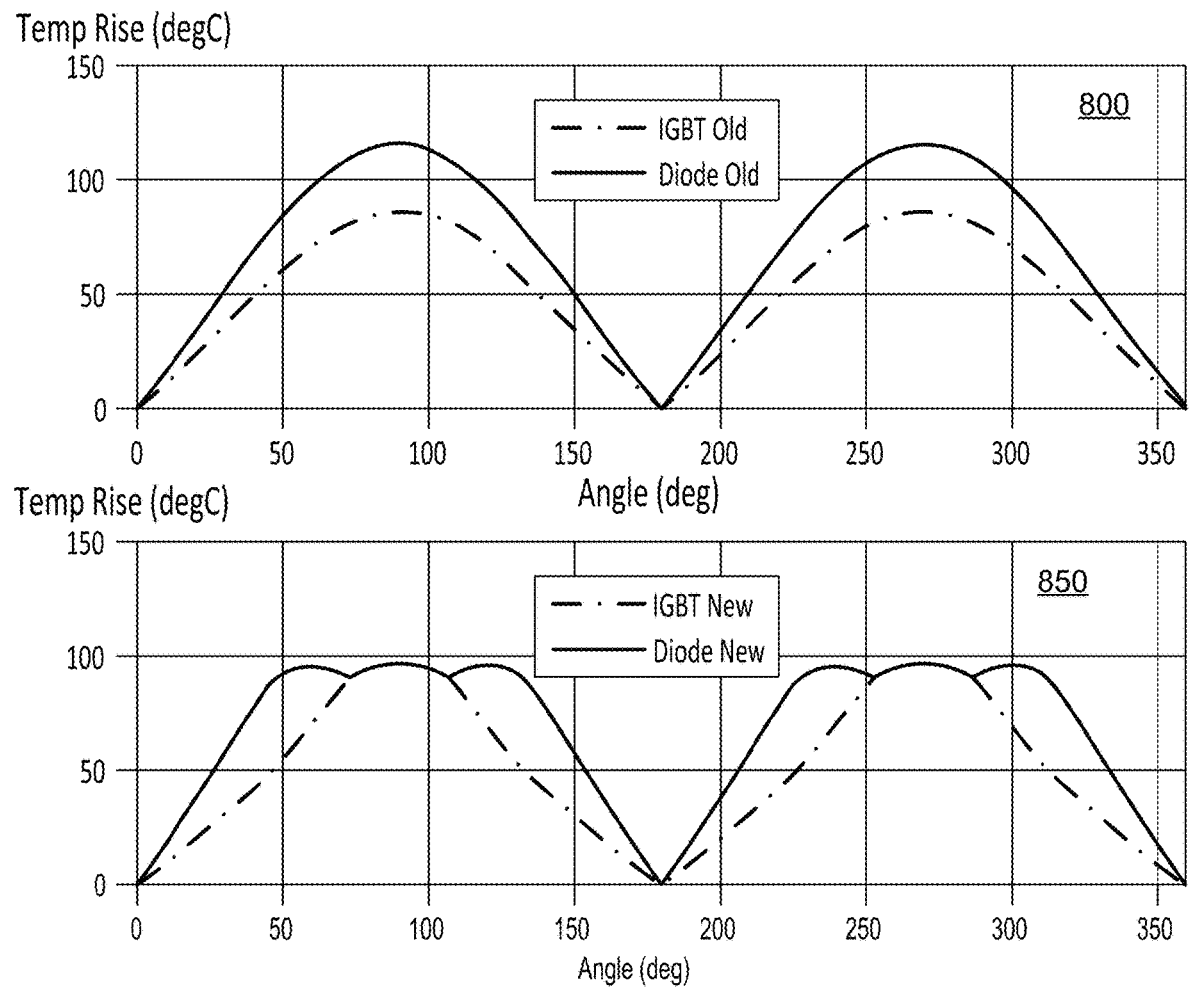
FIG. 8 shows two illustrative plots of diode and IGBT temperature rise with an unmodified duty cycle, and a modified duty cycle, in accordance with some embodiments of the present disclosure.

FIG. 8 shows two illustrative plots of diode and IGBT temperature rise with an unmodified duty cycle (plot 800), and a modified duty cycle (plot 850), in accordance with some embodiments of the present disclosure. Shown in plot 800 are IGBT and diode temperature rises as a function of rotor position (e.g., motor angle) for one phase, with an unmodified duty cycle used. As illustrated in plot 800, the diode is achieving a higher temperature rise, and is thus limiting the peak current. Shown in plot 850 are IGBT and diode temperature rises as a function of rotor position for the same phase, with a modified duty cycle used (e.g., generated using process 200). As illustrated, the peak temperature of the diode is balanced with the peak temperature of the IGBT, thus potentially allowing a larger current to be achieved (e.g., as compared to the unmodified case).

Figure 9:
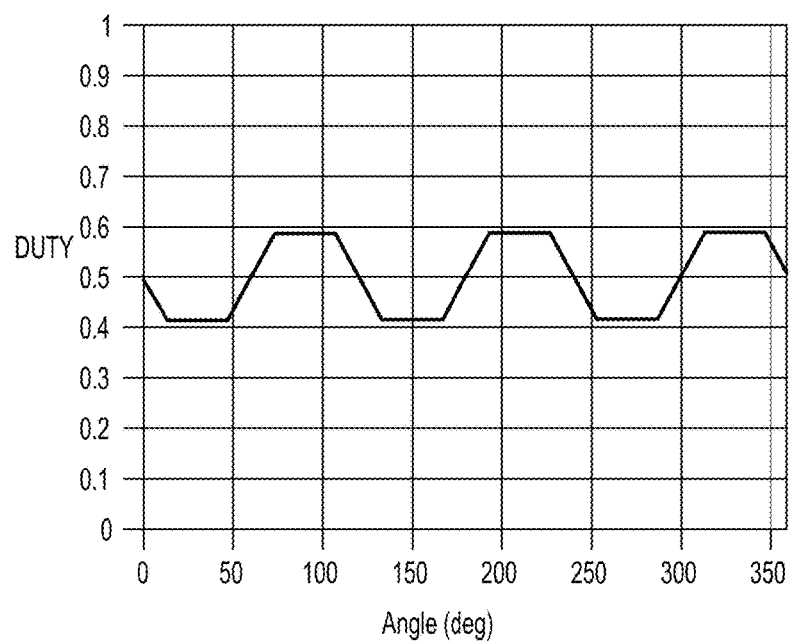
FIG. 9 shows an illustrative modified duty cycle used near a stall condition, in accordance with some embodiments of the present disclosure.

FIG. 9 shows an illustrative modified duty cycle used near a stall condition, in accordance with some embodiments of the present disclosure. The nominal value of duty cycle near stall may be 0.5, with the modified duty cycle showing a modulation range of about 0.1 in either direction (e.g., varying between 0.4 to 0.6). For example, in some embodiments, process 200 may be used to determine a modified duty cycle as illustrated in FIG. 9. By modifying the duty cycle, the IGBT conducts current for longer or shorter time and the diode conducts current for shorter or longer time. For example, as duty cycle is increased, the corresponding switch carries more current, and as duty cycle decreases, the corresponding diode carries more current.

Figure 10:
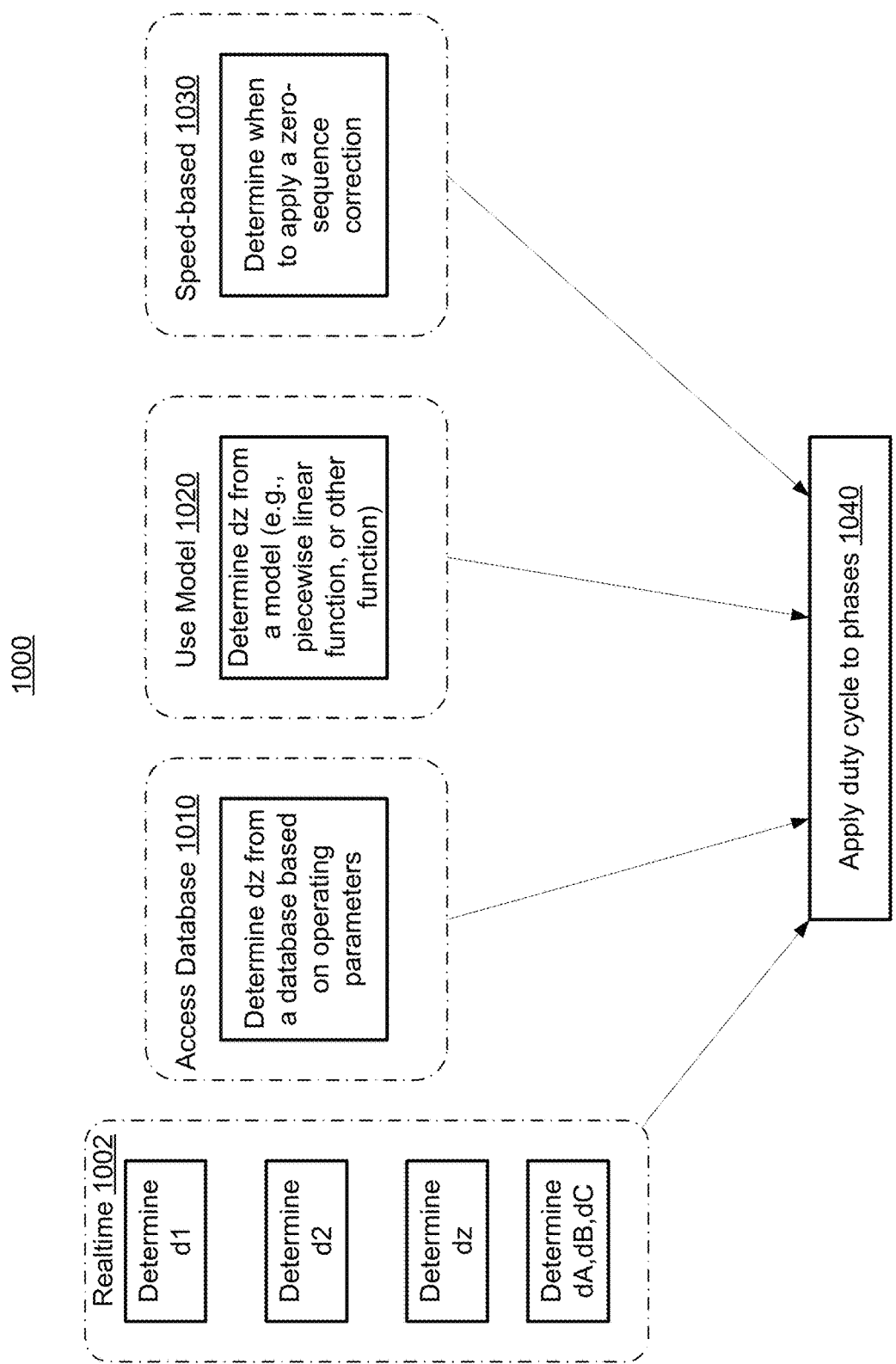
FIG. 10 shows a block diagram of an illustrative process for controlling an electric motor, in accordance with some embodiments of the present disclosure.

FIG. 10 shows a block diagram of illustrative process 1000 for controlling an electric motor, in accordance with some embodiments of the present disclosure. In some embodiments, for example, process 1000 is implemented by control circuitry (e.g., control circuitry 112 of FIG. 1). In an illustrative example, the control circuitry receives signals from one or more sensors indicative of a current, a voltage, an impedance, a power, a temperature, a heat flux, any other suitable property, any suitable change thereof, or any combination thereof.

For a motor drive to apply a control signal having a duty cycle to the phases at step 1040, the control circuitry may be configured to use one or more techniques. For example, technique 1002 includes performing process 200 of FIG. 2 in real-time or near real-time, wherein $d_1$ and $d_2$ are determined, and then duty cycle correction is determined, and finally the corrected duty cycle for each phase is determined. Technique 1010 includes accessing a database of pre-computed duty cycle corrections, or corrected duty cycle values themselves, based on operating parameters. For example, the control circuitry may determine a desired phase current, a voltage, or any other parameter and use the parameter(s) as input to retrieve a duty cycle or correction thereof from the database. Technique 1020 includes determining a duty cycle correction, or corrected duty cycle, based on a mathematical model that may include, for example, a piece-wise linear function, a linear function, a non-linear function, any other suitable function, a table of values that may be interpolated, an algorithm, any other suitable model, or any combination thereof. Technique 1030 includes determining when to begin applying, and stop applying, a duty cycle correction. For example, technique 1030 may include determining a motor speed, and for motor speeds below a threshold value applying a zero-sequence duty cycle correction. Any of techniques 1002-1030 may be combined, omitted, or otherwise modified to determine a duty cycle.

In some embodiments, the control circuitry determines that the motor is in the low-speed operating range is based on at least one sensor signal received by the control circuitry. For example, a speed sensor, a current sensor, or both may be used to identify the low-speed operating range. In some embodiments, the control circuitry determines the duty cycle for each phase of the multiphase electric motor by determining thermal information (e.g., temperature) for the power electronics devices (e.g., IGBTs and diodes, or any other suitable devices). The thermal information may be based on signals received from one or more sensors.

In an illustrative example, the control circuitry may determine the zero-sequence component to be the same for each phase of the multiphase electric motor. In a further illustrative example, the control circuitry may determine which of the power electronics devices are thermally-limiting. In a further example, the control circuitry may retrieve one or more duty cycles from a database based on searching the database based on one or more operating parameters.

The foregoing is merely illustrative of the principles of this disclosure, and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A method for controlling a multiphase electric motor at low speed, the method comprising:
    determining, using control circuitry, that the multiphase electric motor is in a low-speed operating range; and
    in response to determining that the multiphase electric motor is in the low-speed operating range:
        determining, using the control circuitry, a modified duty cycle for each phase of the multiphase electric motor, wherein the modified duty cycle comprises a nominal duty cycle component that is modified by a zero-sequence duty cycle component, and wherein the zero-sequence duty cycle component is applied to each phase of the multiphase electric motor and is configured to balance temperature rises of power electronics devices by reducing a maximum junction temperature of a power electronics device among the power electronic devices; and
        causing, using the control circuitry, each modified duty cycle to be applied to a corresponding switch of the corresponding phase of the multiphase electric motor to cause current flow in the corresponding phase.

2. The method of claim 1, wherein determining the modified duty cycle for each phase of the multiphase electric motor comprises:
    determining a first duty cycle corresponding to a thermal balance between a switch and a diode of a phase;

determining a second duty cycle corresponding to a thermal balance between a pair of like devices of different phases; and determining which duty cycle of the first duty cycle and the second duty cycle is closer to a predetermined value.

3. The method of claim 1, wherein determining the modified duty cycle for each phase of the multiphase electric motor comprises retrieving the modified duty cycle from a database based on searching the database based on one or more operating parameters.

4. The method of claim 1, wherein determining the modified duty cycle for each phase of the multiphase electric motor comprises applying a piecewise function based on one or more operating parameters.

5. The method of claim 1, wherein determining that the multiphase electric motor is in the low-speed operating range is based on at least one sensor signal received by the control circuitry.

6. The method of claim 1, wherein determining the modified duty cycle for each phase of the multiphase electric motor comprises determining thermal information for the power electronics devices.

7. The method of claim 1, wherein the power electronics devices comprise IGBTs and diodes.

8. The method of claim 1, wherein the zero-sequence duty cycle component is the same for each phase of the multiphase electric motor.

9. The method of claim 1, further comprising determining which of the power electronics devices are thermally-limiting.

10. A system for controlling a multiphase electric motor at low speed, the system comprising:
power electronics devices configured to provide current to phases of the multiphase electric motor from a DC power supply; and
control circuitry configured to:
determine that the multiphase electric motor is in a low-speed operating range; and
in response to determining that the multiphase electric motor is in the low-speed operating range:
determine a modified duty cycle for each phase of the multiphase electric motor, wherein the modified duty cycle comprises a nominal duty cycle component that is modified by a zero-sequence duty cycle component, and wherein the zero-sequence duty cycle component is applied to each phase of the multiphase electric motor and is configured to balance temperature rises of power electronics devices by reducing a maximum junction temperature of a power electronics device among the power electronic devices; and
cause each modified duty cycle to be applied to a corresponding switch of the corresponding phase of the multiphase electric motor to cause current flow in the corresponding phase.

11. The system of claim 10, wherein the control circuitry is further configured to:
determine a first duty cycle corresponding to a thermal balance between a switch and a diode of a phase;
determine a second duty cycle corresponding to a thermal balance between a pair of like devices of different phases; and
determine which duty cycle of the first duty cycle and the second duty cycle is closer to a predetermined value.

12. The system of claim 10, wherein the control circuitry is further configured to retrieve the modified duty cycle from a database based on searching the database based on one or more operating parameters.

13. The system of claim 10, wherein the control circuitry is further configured to apply a piecewise function based on one or more operating parameters.

14. The system of claim 10, wherein the control circuitry is further configured to determine that the multiphase electric motor is in the low-speed operating range based on at least one sensor signal received by the control circuitry.

15. The system of claim 10, wherein the control circuitry is further configured to determine thermal information for the power electronics devices.

16. The system of claim 10, wherein the power electronics devices comprise IGBTs and diodes.

17. The system of claim 10, wherein the zero-sequence duty cycle component is the same for each phase of the multiphase electric motor.

18. The system of claim 10, wherein the control circuitry is further configured to determine which of the power electronics devices are thermally-limiting.

19. A control system for controlling a multiphase electric motor at low speed, the control system comprising:
means for determining that the multiphase electric motor is in a low-speed operating range; and
responsive to the determination that the multiphase electric motor is in the low-speed operating range:
means for determining a modified duty cycle for each phase of the multiphase electric motor, wherein the modified duty cycle comprises a nominal duty cycle component that is modified by a zero-sequence duty cycle component, and wherein the zero-cycle duty cycle component is applied to each phase of the multiphase electric motor and is configured to balance temperature rises of power electronics devices by reducing a maximum junction temperature of a power electronics device among the power electronic devices; and
means for causing each modified duty cycle to be applied to a corresponding switch of the corresponding phase of the multiphase electric motor to cause current flow in the corresponding phase.

20. The control system of claim 19, wherein the means for determining the modified duty cycle for each phase of the multiphase electric motor comprises:
means for determining a first duty cycle corresponding to a thermal balance between a switch and a diode of a phase;
means for determining a second duty cycle corresponding to a thermal balance between a pair of like devices of different phases; and
means for determining which duty cycle of the first duty cycle and the second duty cycle is closer to a predetermined value.

* * * * *